United States Patent [19]

Sakemoto et al.

[11] Patent Number: 5,408,452
[45] Date of Patent: Apr. 18, 1995

[54] OPTICAL INFORMATION RECORDING/REPRODUCING SYSTEM INCLUDING NOVEL TRACKING SYSTEM

[75] Inventors: Akito Sakemoto, Ibaraki; Toshinori Sugiyama, Tsukuba; Zenji Tsutsumi, Kokubunji; Shigeru Nakamura, Tachikawa; Masahiro Ojima, Tokyo, all of Japan

[73] Assignees: Hitachi Maxell, Ltd., Osaka; Hitachi Ltd., Tokyo, both of Japan

[21] Appl. No.: 938,254
[22] PCT Filed: Dec. 19, 1991
[86] PCT No.: PCT/JP91/01737
§ 371 Date: Oct. 13, 1992
§ 102(e) Date: Oct. 13, 1992
[87] PCT Pub. No.: WO93/12522
PCT Pub. Date: Jun. 24, 1993

[30] Foreign Application Priority Data

Jun. 20, 1990 [JP] Japan .................. 2-159892

[51] Int. Cl.⁶ .............................. G11B 7/00
[52] U.S. Cl. .................. 369/44.26; 369/44.28; 369/44.41
[58] Field of Search ............... 369/44.35, 44.41, 44.42, 369/44.27, 44.28, 44.29, 44.32, 44.26, 32, 48

[56] References Cited

U.S. PATENT DOCUMENTS

| | | | |
|---|---|---|---|
| 4,707,816 | 11/1987 | Yonezawa et al. | 369/44.26 |
| 4,769,802 | 9/1988 | Tatsduguchi | 369/44.26 |
| 4,787,076 | 11/1988 | Deguchi et al. | 369/44.26 |
| 5,027,337 | 6/1991 | Takahashi et al. | 369/44.26 |
| 5,079,757 | 1/1992 | Wachi et al. | 369/44.35 |
| 5,185,730 | 2/1993 | Komaki et al. | 369/44.26 |
| 5,216,646 | 6/1993 | Imanaka et al. | 369/44.35 |
| 5,268,883 | 12/1993 | Yamaguchi et al. | 369/44.28 |
| 5,268,887 | 12/1993 | Honguh et al. | 369/44.26 |

FOREIGN PATENT DOCUMENTS

217538 10/1985 Japan .
302538 12/1989 Japan .

*Primary Examiner*—Georgia Y. Epps
*Assistant Examiner*—Nabil Hindi
*Attorney, Agent, or Firm*—Birch, Stewart, Kolasch & Birch

[57] ABSTRACT

An optical information recording/reproducing system is disclosed in which optical information having guide grooves for tracking and information pits beforehand provided thereon is irradiated with a main light beam for the recording/reproduction of information and a pair of subsidiary light beams for the detection of tracking and the scanning loci of the centers of the subsidiary light beams are arranged on the optical information carrier on opposite sides of the scanning locus of the center of the main light beam, respectively, first and second means for generating electric signals having their amplitudes corresponding to the respective intensities of the subsidiary light beams reflected by the optical information carrier, third means for detecting a difference in amplitude between the electric output signals of the first and second means, fourth means for detecting Ac components of the electric output signals of the first and second means to detect a difference in amplitude between the AC components, and fifth means for selecting a detection output of the third means as tracking information when the subsidiary light beams scan a region on the optical information carrier where the information pits are not provided and selecting a detection output of the fourth means as tracking information when the subsidiary light beams scan a region on the optical information carrier where the information pits are provided.

3 Claims, 5 Drawing Sheets

(a)

(b)

PRIOR ART

PRIOR ART

OPTICAL INFORMATION RECORDING/REPRODUCING SYSTEM INCLUDING NOVEL TRACKING SYSTEM

TECHNICAL FIELD

The present invention relates to an optical information recording/reproducing system for an optical information carrier such as an optical magnetic disk or a write-once optical disk provided with grooves for tracking, and more particularly to the detection of tracking information from such an optical information carrier.

BACKGROUND ART

As a background of an optical information carrier, such as an optical magnetic disk or a write-once optical disk, a technique is known in which guide grooves are provided on the optical information carrier and are utilized to control the tracking of beams for recording and reproduction of information. A conventional system mainly used as a tracking information detecting system is called a push-pull system. In the push-pull system, tracking information is obtained by using one light beam and detecting a difference in intensity between ± 1st order diffracted lights which are produced when the light beam extends across the guide groove.

However, since the push-pull system utilizes a change in light amount distribution of a far field pattern of reflected light from the optical information carrier corresponding to the difference in intensity between the ± 1st order diffracted lights which is produced in accordance with the degree of extension of the light beam across the guide groove, this system is greatly affected by the inclination of the optical information carrier with respect to the optical axis of beam, the form of the guide groove, the deviation of the optical axis of lenses from the optical axis of beam, the positional deviation of light detectors and so on. Therefore, the requirements for the mechanical characteristic of the optical information carrier are severe. As for an optical information recording/reproducing system, sufficient attention must be paid to the precision of assembling/adjusting an optical head, the positional deviation of parts attendant upon the lapse of time, and so on. In addition, even if sufficient attention is paid, it is difficult to reduce the offset of the light beam with respect to the center axis of the track into zero. Also, in order to minimize a lens shift, a two-stage servo system is employed in which a control is made interlocking a coarse actuator and a fine actuator with each other. There results in an optical information recording/reproducing system which is complicated and high in cost.

As a system for solving the above problems there is known a three-beam system in which three beams are used. In the following, the conventional optical information recording/reproducing system for an optical magnetic disk using the three-beam system will be explained by use of FIG. 4. In the figure there is seen a laser diode, a collimator lens 2, a diffraction grating 3, beam shaping prisms 4 and 5, beam splitters 6 and 7, a riser mirror 8, a focusing lens 9, a ½ wavelength plate 10, a polarized beam splitter splitter 11, a mirror 12, a converging lens 13, a cylindrical lens 14, light detectors 15 to 17, and an optical magnetic disk 18.

In FIG. 4, a laser beam emitted from the laser diode 1 in a horizontal direction is collimated by the collimator lens 2 and is then developed by the diffraction grating 3 into a zero order diffracted light and ± 1st order diffracted lights. Each of those diffracted lights is shaped by the beam shaping prisms 4 and 5 into a light beam having a circular spot form. The zero order diffracted light will be called a main light beam, and the ± 1st order diffracted lights will be called subsidiary light beams. Also, the main and subsidiary light beams will generally be termed a light beam.

The light beam shaped by the beam shaping prisms 4 and 5 into a circular spot form is passed through the beam splitters 5 and 6, risen by the riser mirror 8 in a vertical direction and focussed onto the optical magnetic disk 18 by the focusing lens 9.

The light beam impinging upon the optical magnetic disk 18 is reflected by the optical magnetic disk 18. The light beam with which the optical magnetic disk 18 is irradiated is a P-polarized beam having a plane of polarization parallel to an information track on the optical magnetic disk 18. When an area of the optical magnetic disk 18 having information magnetically recorded thereon is irradiated with such a light beam, the plane of polarization of the light beam is rotated by a Kerr effect in accordance with the magnitude of magnetization of the information area so that a P-polarized component and an S-polarized component having a plane of polarization perpendicular to an optical axis of the light beam are produced. Namely, a reflected light beam includes a P-polarized component and an S-polarized component and the proportion of the P-polarized component and the S-polarized component to each other differs depending upon the magnitude of the Kerr effect.

The reflected light beam from the optical magnetic disk 18 reaches the beam splitter 7 through the focusing lens 9 and the riser mirror 6. The beam splitter 7 reflects the whole of the S-polarized component of the reflected light beam and a part of the S-polarized component thereof. The reflected light beam thus reflected by the beam splitter 7 is rotated in a plane of polarization by 45° by the ½ wavelength plate 10 and is then split by the polarized beam splitter 11 into a P-polarized component and an S-polarized component. The amount of light of a P-polarized component of the zero order diffracted light beam is detected by the light detector 16, and the amount of light of an S-polarized component of the zero order diffracted light passed through the polarized beam splitter 11 and reflected by the mirror 12 is detected by the light detector 17. An information signal magnetically recorded on an information track of the optical information carrier 18 is obtained by producing a difference between output signals of the light detectors 16 and 17, and a signal modulated by pre-pits from brightness to darkness produced by pre-pits on the optical information carrier 18 is obtained by producing a sum of the output signals of the light detectors 16 and 17.

A part of the P-polarized component of the reflected light beam transmitted through the beam splitter 7 is reflected by the beam splitter 6 and is then converged by the converging lens 13. The reflected light beam converged by the converging lens 13 is subjected to astigmatism by the cylindrical lens 14 and is received by the light detector 15. The light detector 15 is composed of six segmental photo diodes. Four of the six photo diodes receive the zero order diffracted light in the reflected light beam having been subjected to astigmatism. Focusing information is obtained by operationally processing output signals of four of those photo diodes.

One of the two remaining photo diodes of the six photo diodes receives the + 1st order diffracted light in the reflected light beam having been subjected to astigmatism and the other photo diode receives the − 1st order diffracted light. Tracking information is obtained by producing a difference between output signals of two of those photo diodes.

According to the three-beam system explained above, the detection of the tracking information uses only a difference in amount of light between the ± 1st order diffracted lights. Therefore, the system is hardly affected by the inclination of the disk with respect to the optical beam axis. Also, it is only required that focus spots of the ±1st order diffracted lights reflected fall off the photo diodes which receive the ± 1st order diffracted lights. Accordingly, the positional adjustment of those photo diodes is easy.

In the case where an optical information carrier is used for recording of code data, it is general that pre-pits are formed on the optical information carrier. In one example, a header portion indicative of address information is formed as pre-pits for every sector. At a location where such pits exist, variations in amount of reflected light of the ± 1st order diffracted lights are produced and have an influence upon the precision of detection of tracking information. However, since the length of the header portion is sufficiently short as compared with that of an area in which data is recorded (or a data area), the influence is not very large.

On the other hand, there may be the case where a data area includes a so-called ROM region in which data is beforehand recorded by pre-pits. When data is reproduced from such a ROM region, the amounts of reflected lights of the ±1st order diffracted lights vary owing to the pre-pits over a long time as compared with the case where pre-pits are formed in only the header portions. As a result, it becomes impossible to obtain correct tracking information. The influence of pre-pits upon the detection of tracking information will now be explained by use of FIG. 5.

FIG. 5(a) shows guide grooves on an optical information carrier and individual light beams involved in the three-beam system. Data is recorded on a track between the guide grooves. The irradiation of the optical information carrier with ± 1st order diffracted light is made with the ± 1st order diffracted lights being shifted by one-fourth of the track pits from a zero order diffracted light on opposite sides of the zero order diffracted light in a direction perpendicular to the track (or an arrow X direction) and being shifted by about 40 μm (when the track pitch is 1.6 μm) from the zero order diffracted light before and behind the zero order diffracted light in a track direction (or an arrow Y direction).

It is assumed that the + 1st order diffracted light is positioned on the right side of the zero order diffracted light and the − 1st order diffracted light is positioned on the left side thereof, when seen in the arrow X direction. The amount of reflected light of each light beam becomes the maximum when the center of that light beam coincides with a center line of the track and becomes the minimum when the center of the light beam coincides with a center line of the guide groove. Therefore, in the case where the optical information carrier is rotated so that the zero order diffracted light and the ± 1st order diffracted lights are moved in the arrow X direction, the amounts of reflected lights of the ± 1st order diffracted lights as taken at the position of the center of the zero order diffracted light exhibit changes as shown in FIG. 5(b). Namely, though the amount of reflected light of each of the ± 1st order diffracted lights changes with a period equal to the track pitch, the change of the amount of reflected light of the ± 1st order diffracted light is in advance of that of reflected light of the zero order diffracted light by a time of the one-fourth of that period and the change of the amount of reflected light of the − 1st order diffracted light is delayed from that of reflected light of the zero order diffracted light by a time of the one-fourth of that period.

The change of reflected light of each light beam shown in FIG. 5(b) corresponds to the case where pre-pits are not formed on the track. When the center of the zero order diffracted light coincides with the center line of the track, the amounts of reflected lights of the ± 1st order diffracted lights become equal to each other. When the center of the zero order diffracted light is shifted from the center line of the track by the one-fourth of the track pitch, a difference in amount of reflected light between the ± 1st order diffracted lights becomes the maximum.

The above concerns the case where the irradiation is made of a portion where pre-pits are not formed on the track. In the case where the irradiation is made of a portion where pre-pits are formed, the intensity of the reflected light of each light beam is modulated by the pre-pits. This situation is shown in FIGS. 5(c) and 5(c′) with reference to a time axis t.

FIG. 5(c) shows a change of the amount of reflected light of the + 1st order diffracted light and FIG. 5(c′) shows a change of the amount of reflected light of the − 1st order diffracted light. In each figure, a broken line represents a change of the amount of reflected light in the case where there is no pre-pit.

Even in the case where pre-pits exist, the amount of reflected light of each of the ± 1st order diffracted lighcs is expected to take the maximum value when the center of that diffracted light coincides with the track center line. However, this holds for the case where an interval between pre-pits or the density of pre-pits is fixed. In actual, the density of pre-pits changes depending upon the contents of information. As the density of pre-pits becomes higher, the effect of interference of light becomes larger so that the amount of reflected light is lowered. Therefore, even if the center of each of the ± 1st order diffracted lights coincides with the track center line, it does not necessarily follow that the amount of reflected light of that diffracted light becomes the maximum. Also, even if the center of the zero order diffracted light coincides with the track center line, it does not necessarily follow that the amounts of reflected lights of the ± 1st order diffracted lights become equal to each other.

In order to eliminate the influence of prepits, there may be considered a method in which the output signal of each of light detectors to receive the reflected lights of the ± 1st order diffracted lights is passed through an LPF (low pass filter) to extract an average value (or a DC component) without modulated components caused by the pre-pits and the levels of the extracted DC components for the ± 1st order diffracted lights are compared to obtain tracking information.

However, the obtained DC component also changes in accordance with the modulation by the prepits or in accordance with the density of pre-pits, as shown as the average value by a solid line in FIG. 5(c) or 5(c′). Therefore, a tracking information signal obtained by comparing the levels of the DC components results in a solid line shown in FIG. 5(d). Namely, a normal tracking information signal cannot be obtained, as apparent from the comparison of the solid line of FIG. 5(d) with a broken line of FIG. 5(d) which represents a correct tracking information signal obtained from the amounts of reflected lights of the ± 1st order diffracted lights shown by the solid lines in FIG. 5(b).

SUMMARY OF THE INVENTION

An object of the present invention is to solve the above problem, thereby providing an information recording/reproducing system in which normal tracking information can be obtained even from a region where pre-pits are formed.

To attain the above object, the present invention is provided with first means for comparing the levels of electric signals having amplitudes corresponding to the amounts of respective reflected lights of two subsidiary light beams for the detection of tracking, as in the prior art, second means for detecting the amplitudes of AC components of the electric signals and comparing the levels of the detected amplitudes, and third means for selecting an output signal of the first means as a tracking information signal for a region on an optical information carrier where pre-pits do not exist and selecting an output of the second means as a tracking information signal for a region on the optical information carrier where pre-pits exist.

As has already been mentioned, when the subsidiary light beam scans a region where pre-pits are formed, the reflected light of the subsidiary light beam is subjected to intensity modulation by the pre-pits and therefore includes an AC component. Though the AC component encounters the influence of the density of pre-pits, this influence is such that it lowers the level of the AC component as a whole as the density of pre-pits becomes higher. This is because the effect of interference of light becomes larger as the density of pre-pits becomes higher.

But then, the amplitude of the AC component generally represents a position of the subsidiary light beam in a track width direction. Accordingly, it is possible to obtain tracking information by detecting a difference in amplitude between the AC components of the reflected beams of the two subsidiary light beams.

Accordingly, it is possible to always obtain satisfactory tracking information by using the output of the first means as a tracking information signal for a region including no pre-pit since the AC components are not obtained and using the output of the second means as a tracking information signal for a region including pre-pits.

Nevertheless, the amplitude of the AC component encounters the influence of the density of pre-pits. In order to eliminate this influence, the amplitude of the AC component may be corrected in accordance with the density of pre-pits. Thereby, more accurate tracking information can be obtained.

DETAILED DICUSSION

Embodiments of the present invention will be explained by use of the drawings.

Figure 4:
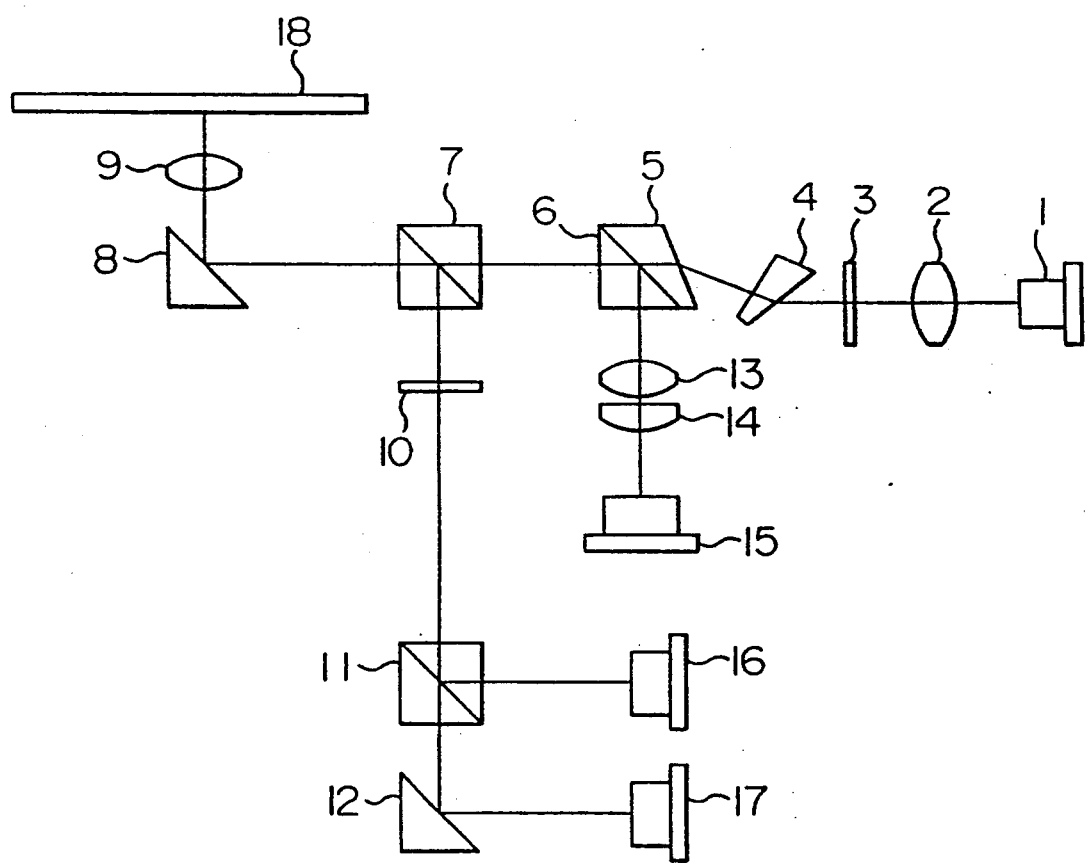
FIG. 4 is a view showing the construction of one example of an optical system of a conventional optical information recording/reproducing system.
Figure 5A:
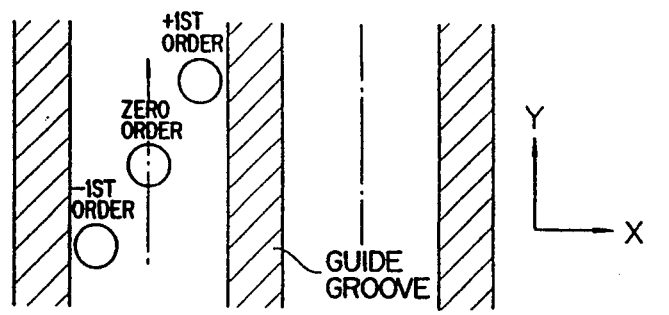
FIG. 5 shows diagrams for explaining the influence of pre-pits when tracking information is detected.
Figure 5B:
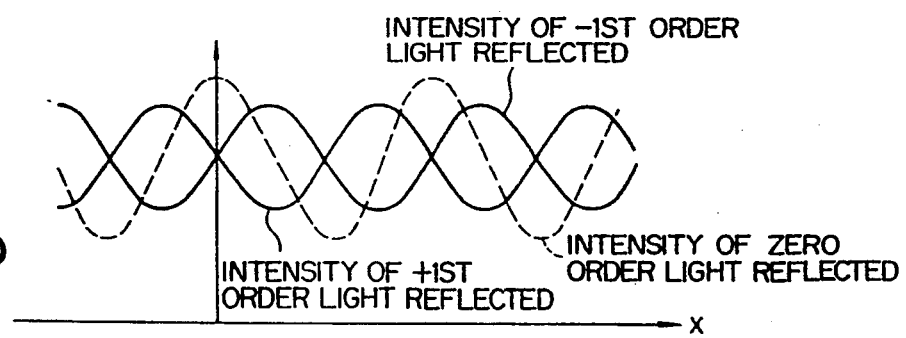
Figure 5C:
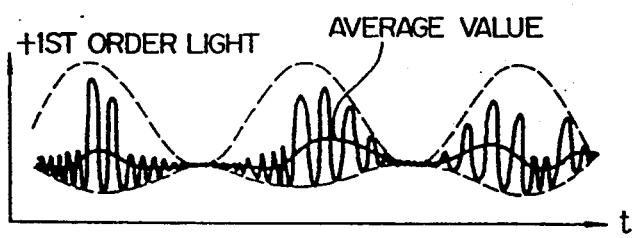
Figure 5C:
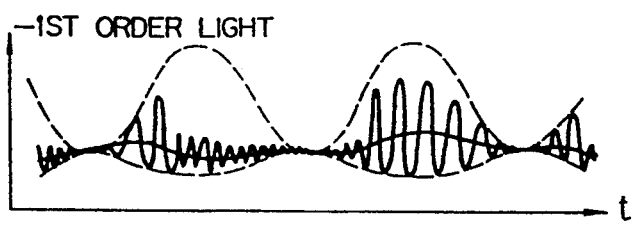
Figure 5D:
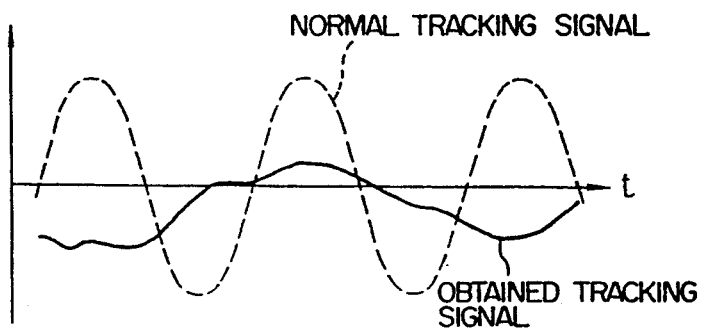

First, an optical system in an embodiment of an optical information recording/reproducing system according to the present invention will be explained by use of FIG. 1. FIG. 1(a) is a top view of the optical system and FIG. 1(b) is a side view thereof. There is seen a half mirror 19, a Wallaston prism 20, a converging lens 21, a light detector 22, and a mirror 23. Parts in FIGS. 1(a) and 1(b) corresponding to those in FIG. 4 are designated by the same reference numerals as those used in FIG. 4.

In FIGS. 1(a) and 1(b), a laser beam emitted from a laser diode 1 is subjected to a process similar to that in the conventional system, that is, the convension by a collimator lens 2 and beam shaping prisms 4 and 5 into a collimated beam having a circular spot form and thereafter the development by a diffraction grating 3 into a zero order diffracted light (or a main light beam) and ± 1st order diffracted lights (or subsidiary light beams). A beam splitter 7 reflects all of S-polarized components slightly included in the incoming main and subsidiary light beams and a part of P-polarized components to transmit only the P-polarized components. The main and subsidiary light beams passed through the beam splitter 7 are risen by a riser mirror 8 and is focused onto an optical information carrier 18 by a focusing lens 9.

Provided that the pitch of tracks on the optical information carrier 18 is 1.6 $\mu$m, the irradiation of the optical information carrier 18 with the ± 1st order diffracted lights is made with those lights being shifted by 0.4 $\mu$m for the one-fourth of the track pitch) from the zero order diffracted light on the right and left sides of the zero order diffracted light in a track width direction and being shifted by about 40 $\mu$m from the zero order diffracted light before and behind the zero order diffracted light in a track length direction.

When the optical information carrier 18 is an optical magnetic medium, the main and subsidiary light beams reflected encounter a Kerr effect in accordance with a magnetic field intensity resulting from the recording of information. Namely, the plane of polarization is rotated so that an S-polarized component is produced and a P-polarized component is correspondingly reduced. The main and subsidiary light beams thus reflected from the optical information carrier 18 are passed through the focusing lens 9 and is reflected by the riser mirror 8 so that the beams enter the beam splitter 7. The beam splitter 7 reflects the whole of the S-polarized component included in each diffracted light and a part of the P-polarized component included in the diffracted light.

Each of the main and subsidiary light beams reflected by the beam splitter 7 is split by the half mirror 19 into two parts or one part which is reflected by the half mirror 19 and the other part which is transmitted through the half mirror 19. The one part of each of the main and subsidiary light beams reflected by the half mirror 19 is passed through a ½ wavelength plate 10 and is divided by the Wallaston prism 20 into a P-polarized component and an S-polarized component. The P-polarized component and the S-polarized component of the zero order diffracted light are converged by the converging lens 21 so that they impinge upon individual photo diodes of the light detector 22 which includes two segmental photo diodes. An information signal magnetically recorded on the optical information carrier 18 can obtained by producing a difference between output signals of the two photo diodes, and a signal representative of light and darkness produced by pre-pits on the optical information carrier 18 can be obtained by producing a sum of the output signals of the two photo diodes.

The other part of each of the main and subsidiary light beams transmitted through the half mirror 19 is passed through a converging lens 13 and a cylindrical lens 14 and is then reflected by the mirror 23 so that it impinges upon a light detector 15. The light detector 15 includes four segmental photo diodes and two single photo diodes disposed on opposite sides of the array of the four segmental photo diodes. The main light beam (or the zero order diffracted light) reflected by the mirror 23 impinges upon the four segmental photo diodes, one (or the + 1st order diffracted light) of the subsidiary light beams reflected by the mirror 23 impinges upon one of the two single photo diodes and the other subsidiary light beam (or the −1st order diffracted light) reflected by the mirror 23 impinges upon the other single photo diode.

A tracking information signal, a focusing information signal and so on are formed iron an output signal of the light detector 15. Means for detecting such information signals will now be explained by use of FIG. 2. In the figure, there is seen a four-segmented photo diode 15a photo diodes $15a_1$ to $15a_4$, photo diodes 15b and 15c operational amplifiers 24 and 25 an LPF 26, a waveform equalizing circuit 27, an upper envelope detecting circuit 28, a lower envelope detecting circuit 29, a differential amplifier 30, waveform equalizing circuits 35 and 36 upper envelope detecting circuits 37 and 38, lower envelope detecting circuits 39 and 40 an operational amplifier 41, a switch 42, level comparing circuits 43 and 44 a delay circuit 45, AND gates 46 to 49, and an input terminal 50.

The light detector 15 includes the four-segmented photo diodes composed of the four segmental photo diodes $15a_1$ to $15a_4$ and the two photo diodes 15b and 15c disposed on opposite sides of the four-segmented photo diode 15a. The four-segmented photo diode 15a receives the zero order diffracted light reflected from the optical information carrier, the photo diode 15b receives the + 1st order diffracted light reflected from the optical information carrier and the photo diode 15c receives the − 1st order diffracted light reflected from the optical information carrier. When the focusing lens 9 is not at a focusing position with respect to the optical-information carrier (see FIG. 1), a spot of the zero order diffracted light produced on the four-segmented photo diode 15a takes an ellipse form having as its axial directions the direction of a line joining the photo diodes $15a_1$ and $15a_4$ and the direction of a line joining the photo diodes $15a_1$ and $15a_3$ since the zero order diffracted light has been passed through the converging lens 13 and the cylindrical lens 14 (see FIG. 1(a)). The ratio of one of the two axes of this ellipse to the other axis changes in accordance with a distance from the optical information carrier 18 to the focusing lens 9.

Thus, a focusing information signal e is obtained by subtracting a sum of output signals of the photo diodes $15a_1$ and $15a_4$ in the four-segmented photo diode 15a from a sum of output signals of the photo diodes $15a_2$ and $15a_3$ by the operational amplifier 24.

An output signal of the photo diode 15b having a level corresponding to the light amount of the + 1st order diffracted light is amplified by an amplifier 33 and is thereafter supplied to a differential amplifier 34 and the waveform equalizing circuit 35. Also, an output signal of the photo diode 15c having a level corresponding to the light amount of the −1st order diffracted light is amplified by an amplifier 32 and is thereafter supplied to the differential amplifier 34 and the waveform equalizing circuit 35. The differential amplifier 34 subtracts an output signal of the amplifier 32 from an output signal of the amplifier 33 to obtain a signal c which has a level proportional to a difference in light amount between the ± 1st order diffracted lights. This output signal C of the differential amplifier 34 is tracking information when the main and subsidiary light beams scan a region on the optical information carrier 18 (see FIG. 1(b)) where pre-pits do not exist.

As has already been explained, when the main and subsidiary light beams scan a region on the optical information carrier 18 where pre-pits exist, each of the main and subsidiary light beams reflected from the optical information carrier 18 is subjected to modulation in accordance with the density of pre-pits and the amount of light of the reflected beam varies. As a result, the output signal of each of the amplifiers 32 and 33 includes an AC component having a frequency corresponding to the density of pre-pits and the amplitude of the AC component is affected by the density of pre-pits so that the amplitude becomes smaller as the density of pre-pits becomes higher. The waveform equalizing circuits 35 and 36 compensate for such variations in amplitude of the AC components in the output signals of the amplifiers 32 and 33 depending upon the density of pre-pits so that the amplitude of the AC component corresponds to a position of the subsidiary light beam in the track width direction.

An output signal of the waveform equalizing circuit 35 is detected by the upper envelope detecting circuit 37 and the lower envelope detecting circuit 39. The upper envelope detecting circuit 37 produces a signal a representative of an upper envelope of the AC component (or an upper envelope signal) and the lower envelope detecting circuit 39 produces a signal b representative of a lower envelope of the Ac component (or a lower envelope signal). Similarly, the output signal of the waveform equalizing circuit 36 are supplied to the upper envelope detecting circuit 38 and the lower envelope detecting circuit 40 which in turn produce an upper envelope signal a' and a lower envelope signal b' for the AC component, respectively. The operational amplifier 41 performs an operational processing of (a-b)-(a'-b') where (a-b) is a difference between the upper envelope signal a and the lower envelope signal b and represents the amplitude of the AC component in the output signal of the waveform equalizing circuit 35 and (a'-b') similarly represents the amplitude of the AC component in the output signal of the waveform equilizing circuit 36. Accordingly, a signal d outputted from the operational amplifier 41 represents a difference in amplitude between the AC components in the waveform equalizing circuits 35 and 36 and hence tracking information when the main and subsidiary light beams scan a region on the optical information carrier 18 where pre-pits exist.

The switch 42 is controlled by a control signal j from the input terminal 50. When the main and subsidiary light beams scan a region on the optical information carrier 18 where pre-pits do not exist, the switch 42 is closed on the A side to select the output signal C of the differential amplifier 34 as a tracking information signal i. When the main and subsidiary light beams scan a region on the optical information carrier 18 where pre-pits exist, the switch 42 is closed on the B side to select the output signal d of the operational amplifier 41 as the tracking information signal i. A tracking control for the main and subsidiary light beams is made by the tracking information signal i.

In this manner, it becomes possible to make a satisfactory tracking control for either a region on the optical information carrier 18 which include no pre-pit or a region on the optical information carrier 18 which includes pre-pits, and it becomes possible to make a satisfactory tracking control for both an optical information carrier on which pre-pits are not formed and an optical information carrier on which pre-pits are provided.

Also, since a requisition made upon the photo diodes 15b and 15c is only to completely receive the subsidiary light beams reflected from the optical information carrier, the precision of assemblage of an optical system including the arrangement of the photo diodes 15b and 15c is moderated, thereby making it possible to construct the optical system at a low cost and the precision of an optical information carrier can be moderated.

Next, the other portion of FIG. 2 will be explained.

Output signals of the photo diodes $15a_1$ to $15a_4$ in the four-segmented photo diode 15a are added by the operational amplifier 25, thereby obtaining a signal having a level proportional to the amount of the zero order diffracted light received by the four-segmented photo diode 15a. The output signal of the operational amplifier 25 is supplied to a switch 31 on one hand after a component modulated by pre-pits has been eliminated by the LPF 26 and on the other hand after compensation for a variation in amplitude of the AC component caused by pre-pits has been made by the waveform equalizing circuit 27 having a function similar to the functions of the waveform equalizing circuits 35 and 36 and a signal representive of the amplitude of the AC component has then been produced by the upper envelope detecting circuit 28, the lower envelope detecting circuit 29 and the differential amplifier 30.

When the main light beam scans a region on the optical information carrier 18 where pre-pits do not exist an output of the LPF 26 represents the amount of the zero order diffracted light received by the four-segmented photo diode 15a. When the main light beam scans a region on the optical information carrier 18 where pre-pits exist, an output signal of the differential amplifier 30 represents the amount of the zero order diffracted light received by the four-segmented photo diode 15a.

The switch 31 is controlled by the control signal j from the input terminal 50. When the main light beam scans a region on the optical information carrier 18 where pre-pits do not exist, the switch 31 is closed on the A side to select the output signal of the LPF 26 as a light amount signal f for the main light beam. When the main light beam scans a region on the optical information carrier 18 where pre-pits exist, the switch 31 is closed on the B side to select the output of the differential amplifier 30 as the light amount signal f.

Figure 1:
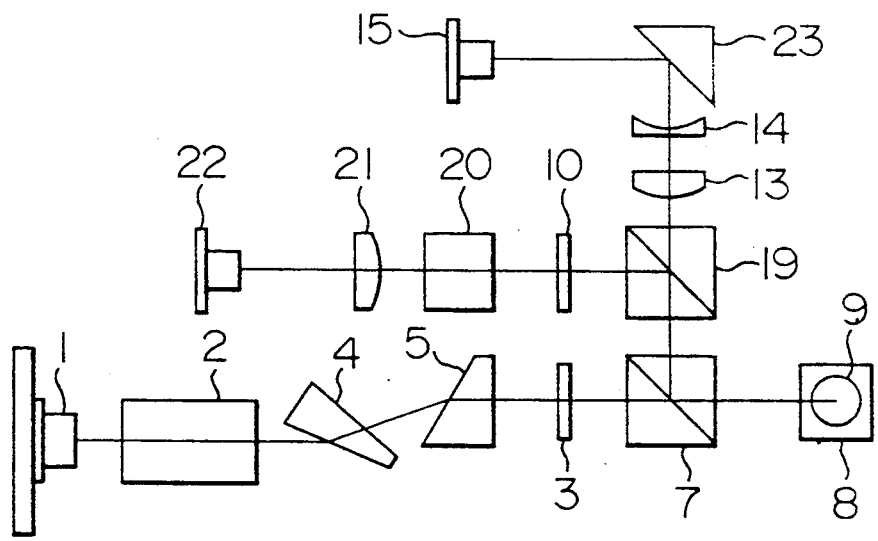
FIG. 1(a) is a top view showing an optical system in an embodiment of an optical information recording/reproducing system according to the present invention.
FIG. 1(b) is a side view of the optical system of FIG. 1(b)
Figure 1:
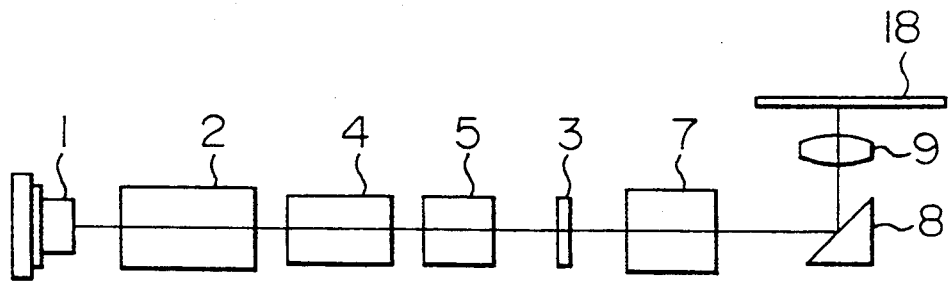

When the optical information carrier 18 is mounted on the optical information recording/reproducing system and the system is started up, the focusing lens 9 shown in FIG. 1 is lifted from the lower side to come near the optical information carrier and a spot of the main light beam on the four-segmented photo diode 15a becomes correspondingly small so that the level of the light amount signal f is increased. When the level of the light amount signal f exceeds a present threshold vale, a focusing control by the focusing information signal e is started. In this manner, the pull-in of a focusing servo circuit upon start-up is rapidly made.

The tracking information signal i obtained by the switch 42 is also level compared with a zero potential by the level comparing circuit 44 to produce a rectangular signal K which alternately rises and falls at successive zero cross points of the tracking information signal i. This rectangular signal K is supplied to the AND gate 46 on one hand and is supplied to the AND gate 47 after level inversion on the other hand. Also, the rectangular signal K is delayed slightly by the delay circuit 45 and is then supplied to the AND gate 46 after level inversion on one hand and to the AND gate 47 on the other hand. Accordingly, the AND gate 46 produces at the timing of a rising edge of the rectangular signal K a rise edge pulse m which has a duration equal to the delay time of the delay circuit 45, and the AND gate 47 similarly produces a fall edge pulse n.

On the other hand, the light amount signal f obtained by the switch 31 is also compared with a reference voltage V1 by the level comparing circuit 43 to produce a gate signal P. This gate signal P is supplied to the AND gates 48 and 49. When the light amount signal f has a level equal to or higher than the reference voltage V1, the AND gate 48 and 49 are turned on to pass the rise edge pulse m and the fall edge pulse n as track cross signals g and h, respectively.

These track cross signals g and h are alternately generated at the timing of zero cross of the tracking information signal f when the main light beam moves crossing a track on the optical information carrier 18. However, the zero cross point of the tracking information signal f appears both when the center of the main light beam is on a track center line and when it is on a center line of a guide groove between tracks. And, in the case where one of the track cross signals g and h is generated when the center of the main light beam is on the track center line, the other track cross signal is generated when the center of the main light beam is on the center of the guide groove. In addition, whether the track cross signal g or h is generated when the center of the main light beam is on the track center line, differs depending upon the direction of movement of the main light beam.

The AND gates 48 and 49 controlled by the gate signal p outputted from the level comparing circuit 43 are provided for making a discrimation for the above. Namely, when the center of the main light beam is on the track center line, the gate signal p is always "H" and the AND gates 48 and 49 are turned on. Accordingly, if the rise edge pulse m is generated when the center of the main light beam is on the track center line, this rise edge pulse m is passed through the AND gate 48 and hence the track cross signal g is obtained. Reversely, if the fall edge pulse n is generated when the center of the main light beam is on the track center line, this fall edge pulse n is passed through the AND gate 49 and hence the track cross signal h is obtained.

By counting the track cross signal g or h, it is possible to detect the number of tracks which the main light beam crosses. As a result, a position and a speed upon track seeking can be detected.

Figure 2:
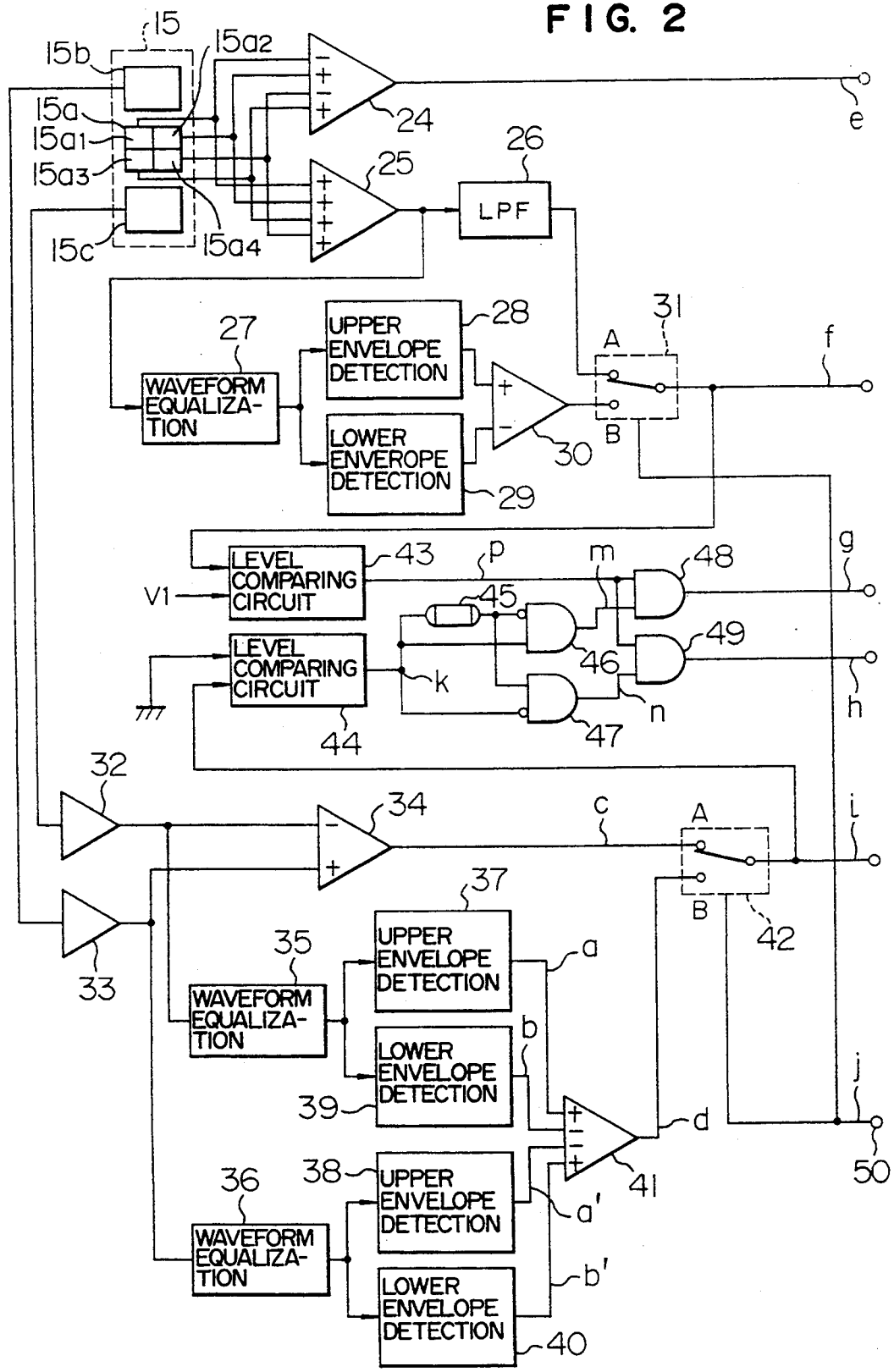
FIG. 2 is a block diagram showing a control information detecting section of the embodiment.
Figure 3:
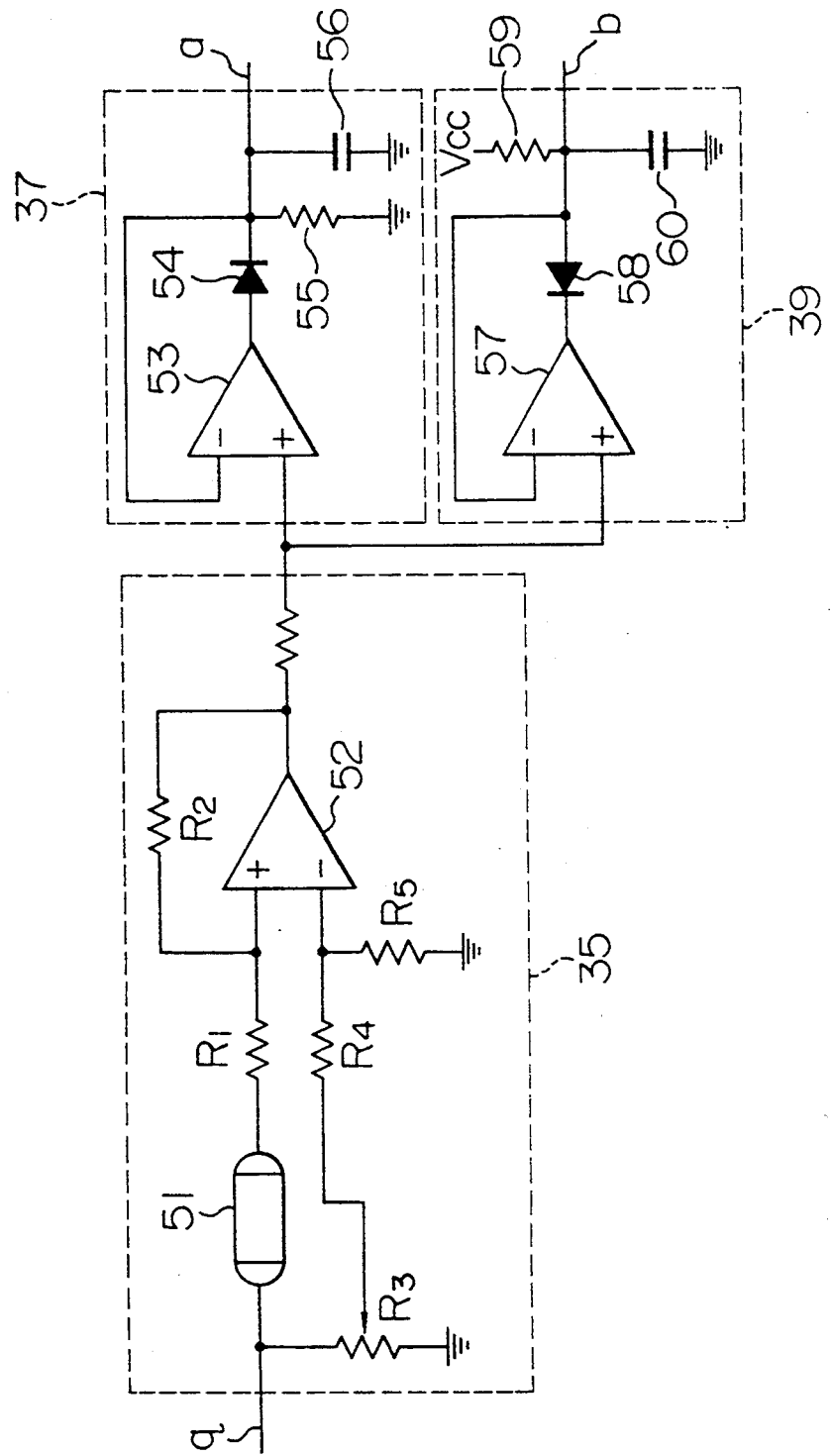
FIG. 3 is a block diagram showing one example of a waveform equalizing circuit, an upper envelope detecting circuit and a lower envelope detecting circuit shown in FIG. 2.

FIG. 3 is a circuit diagram showing one example of the waveform equalizing circuit 35, the upper envelope detecting circuit 37 and the lower envelope detecting circuit 39 shown in FIG. 2.

Referring to FIG. 3, in the waveform equalizing circuit 35, the output signal q of the amplifier 32 (see FIG. 2) is delayed by a delay line 51 with a fixed amount of delay and is thereafter supplied to an operational amplifier 52 through a resistor $R_1$ as an input which is not to be inverted. The signal q is also divided by resistors $R_3$ to $R_5$ and is supplied to the operational amplifier 52 as an input which is to be inverted. An output terminal of the operational amplifier 52 is connected o a non-inversion input terminal of the operational amplifier 52 through a resistor $R_2$.

With such a construction, the gain is increased by virtue of the action of the delay line 51 as the frequency of the input signal q becomes higher. Accordingly, compensation for a variation in amplitude of an AC component of the input signal q depending upon the density of pre-pits can be made by properly setting the delay time of the delay line 51 and the resistance values of the resistors $R_1$ to $R_5$.

It is, needless to say, that the delay time of the delay line 51 should be shorter than the minimum period of the AC component of the input signal q.

In the upper envelope detecting circuit 37, the output signal r of the waveform equalizing circuit 35 is supplied to an operational amplifier 53 as an input which is not to be inverted. An output terminal of the operational amplifier 53 is connected to an anode of a diode 54, and a cathode of the diode 54 is connected to a resistor 55, a capacitor 56 and an inversion input terminal of the operational amplifier 53.

With such a construction, if a forward voltage of the diode 54 is ignored, the capacitor 56 is charged by an output signal of the operational amplifier 53 when the level of the output signal r of the waveform equalizing circuit 35 is higher than a charged voltage of the capacitor 56. When the case is reverse, the capacitor 56 is discharged through the resistor 55.

With this operation, the charged voltage of the capacitor 56 follows an upper envelope of an AC component of the output signal r of the waveform equalizing circuit 35. As a result, the upper envelope signal a is obtained.

In the lower envelope detecting circuit 39, the output signal r of the waveform equalizing circuit 35 is supplied to an operational amplifier 57 as an input which is not to be inverted. An output terminal of the operational amplifier 57 is connected to a cathode of a diode 58, and an anode of the diode 58 is connected to a capacitor 60, to an inversion terminal of the operational amplifier 57 and through a resistor 59 to a power source terminal of a power source voltage $V_{cc}$.

With such a construction, when the level of the output signal r of the waveform equalizing circuit 35 is lower than a charged voltage of the capacitor 60, the capacitor 60 is discharged through the diode 58. When the case is reverse, the capacitor 60 is charged by the power source voltage $V_{cc}$ through the resistor 59.

Thereby, the charged voltage of the capacitor 60 follows a lower envelope of an Ac component of the output signal r of the waveform equalizing circuit 35. As a result, the lower envelope signal b is obtained.

The similar holds for the waveform equalizing circuits 36 and 27, the upper envelope detecting circuits 38 and 28 and the lower envelope detecting circuits 40 and 29.

It is needless to say that the present invention is applicable to not only an optical magnetic disk but also another optical information carrier, such as a write one and read many type, of in which guide grooves and pits to cause the interference of light are formed.

INDUSTRIAL APPLICABILITY

As has been explained in the foregoing, the present invention enables a satisfactory tracking control always, irrespective of whether or not an optical information carrier includes pits which causes the interference of light. Accordingly, it is possible to make a satisfactory tracking control for an optical information carrier in which such pits are not provided and an optical information carrier in which an information signal is generally recorded by such pits, not to mention an optical information carrier in which there coexist a region where pits are provided and a region where pits are not provided.

Also, since the precision of assembling of an optical system, the precision of an optical information carrier, and so on can be moderated, it is possible to construct the optical system at a low cost.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An optical information recording/reproducing system comprising means for irradiating and scanning with a light beam an optical information carrier which includes a region where guide grooves exist but pre-pits do not exist and a ROM region where pre-pits exist, said light beam including at least a beam for recording/reproducing information and two light beams for tracking, means for receiving reflected light of said light beam, means for detecting a signal corresponding to the intensity of light impinging upon said light receiving means, detecting means for making a distinction between a tracking signal at said region where pre-pits do not exist and a tracking signal at said ROM region, means for selecting a tracking signal in accordance with a signal from said detecting means for making the distinction between the tracking signal at said region where pre-pits do not exist and the tracking signal at said ROM region, first and second means for generating electric signals having their amplitudes corresponding to the respective intensities of reflected light of subsidiary light beams, third means for detecting a difference in amplitude between the electric output signals of said first and second means, fourth means for detecting AC components of said electric output signals of said first and second means to detect a difference in amplitude between said AC components, and a fifth means for selecting a detection output of said third means as the tracking signal for said region where the recording of information is possible and selecting a detection output 2. An optical information recording/reproducing system according to claims 1, comprising means for making a judgment of whether a region being scanned by said light beam is that region where the recording of information is possible or that region where the reading of information is to be exclusively made.

3. An optical information recording/reproducing system according to claim 2, wherein said fourth means includes means for compensating for variations in amplitude of the AC components of said first and second means caused by a difference in density of information pits.

* * * * *